United States Patent
Chiang

(10) Patent No.: US 11,852,558 B2
(45) Date of Patent: Dec. 26, 2023

(54) POWER MEASURING SYSTEM AND METHOD OF ESTIMATING TOTAL POWER

(71) Applicant: TIEN HSIN INDUSTRIES CO., LTD., Taichung (TW)

(72) Inventor: Meng-Hua Chiang, Taichung (TW)

(73) Assignee: TIEN HSIN INDUSTRIES, CO., LTD., Taichung (TW)

( * ) Notice: Subject to any disclaimer, the term of this patent is extended or adjusted under 35 U.S.C. 154(b) by 881 days.

(21) Appl. No.: 16/887,406

(22) Filed: May 29, 2020

(65) Prior Publication Data

US 2021/0372871 A1 Dec. 2, 2021

(51) Int. Cl.

| | |
|---|---|
| *G01L 3/24* | (2006.01) |
| *B62J 45/422* | (2020.01) |
| *B62J 45/41* | (2020.01) |
| *B62J 45/421* | (2020.01) |
| *B62J 45/20* | (2020.01) |
| *A63B 24/00* | (2006.01) |

(52) U.S. Cl.
CPC ............ *G01L 3/24* (2013.01); *A63B 24/0062* (2013.01); *B62J 45/41* (2020.02); *B62J 45/421* (2020.02); *B62J 45/422* (2020.02); *B62J 45/20* (2020.02)

(58) Field of Classification Search
CPC .. G01L 3/24; B62J 45/41; B62J 45/421; B62J 45/422; B62J 45/20; A63B 24/0062
See application file for complete search history.

(56) References Cited

U.S. PATENT DOCUMENTS

| | | | |
|---|---|---|---|
| 2006/0185940 A1* | 8/2006 | Tsai | B62L 3/02 188/24.12 |
| 2016/0016630 A1* | 1/2016 | Thompson | B62M 6/45 74/519 |
| 2016/0136481 A1* | 5/2016 | Iverson | B62J 45/421 73/379.07 |
| 2017/0008601 A1* | 1/2017 | Zenner | B62M 6/45 |
| 2018/0009503 A1* | 1/2018 | Kinpara | B62M 6/55 |

FOREIGN PATENT DOCUMENTS

CN 105501372 A * 4/2016

* cited by examiner

*Primary Examiner* — Natalie Huls
*Assistant Examiner* — Sharad Timilsina
(74) *Attorney, Agent, or Firm* — Apex Juris, pllc; R. Lynette Wylie

(57) ABSTRACT

A power measuring system includes a processor, a control unit, a memory unit, and a power sensor including a sensing unit and a signal processing unit correspondingly outputting an electrical signal according to a deformation of the sensing unit. The sensing unit is disposed to either a right operational part or a left operational part of a bicycle. The control unit is controlled by a user and outputs a weighting command. The processor receives the weighting command and stores the weighting command into the memory unit, and obtains a weighting parameter corresponding to the weighting command according to a reference table stored in the memory unit, and receives the electrical signal outputted from the signal processing unit, and calculates a first power value, and multiplies the first power value by the weighting parameter to get a second power value, and adds the first power value and the second power value to obtain a total power value.

8 Claims, 5 Drawing Sheets

POWER MEASURING SYSTEM AND METHOD OF ESTIMATING TOTAL POWER

BACKGROUND OF THE INVENTION

Technical Field

The present disclosure relates generally to a single-sided power meter of a bicycle, and more particularly to a power measuring system and a method of estimating total power which uses a single-sided power measured by a single-sided power meter to estimate a total power exerted on a bicycle.

Description of Related Art

In order to monitor a riding performance, a bicyclist usually mounts a power meter on a bicycle to make a riding performance measurable, wherein a measuring result could be used as a reference for training. The conventional power meter is generally mounted to two lateral sides of the bicycle. For example, the power meter is mounted either on pedals or on cranks of the two lateral sides of the bicycle to respectively measure forces exerted to the two lateral sides of the bicycle by the bicyclist, thereby to calculate a total power exerted by the bicyclist. However, although to mount a power meter on the two lateral sides could effectively measure the total power, a bilateral power meter is very expensive and is difficult to mount so that using the bilateral power meter could increase a training cost and decrease convenience.

In order to decrease the training cost, a single-sided power meter is developed. The single-sided power meter just needs to be mounted on one of the two lateral sides of the bicycle (i.e. on either a pedal or a crank of one lateral side) to measure a force applied to one lateral side of the bicycle by one leg of the bicyclist to calculate a single-sided power exerted by that leg of the bicyclist. Then, directly double the single-sided power to obtain an estimated total power. However, this calculation is based on an assumption that two legs of the bicyclist exert completely same power. Practically, even a well-trained bicyclist may pedal unevenly based on some factors, such as different strengths, different coordination, different degree of fatigue of two legs, and so on. Therefore, although the cost of the single-sided power meter is lower, the single-sided power meter generally not accurate. Obviously, the conventional single-sided power meter has room for improvement.

BRIEF SUMMARY OF THE INVENTION

In view of the above, the primary objective of the present disclosure is to provide a power measuring system and a method of estimating total power in order to estimate a total power exerted on a bicycle by a bicyclist more accurately.

The present disclosure provides a power measuring system adapted to a bicycle. The bicycle includes a right operational part and a left operational part, wherein the right operational part and the left operational part are operable for a user to drive the bicycle. The power measuring system includes a power sensor, a control unit, a memory unit, and a processor. The power sensor includes a sensing unit and a signal processing unit, wherein the sensing unit is disposed to either the right operational part or the left operational part. The signal processing unit is connected to the sensing unit by signal. The signal processing unit correspondingly outputs an electrical signal according to a deformation of the sensing unit. The control unit is adapted to be controlled by the user and to output a weighting command. The memory unit adapted to store a reference table and the weighting command inputted via the control unit. The processor connected to the signal processing unit, the memory unit, and the control unit by signal. After the processor receives the weighting command, and stores the weighting command into the memory unit. The processor accesses a weighting parameter corresponding to the weighting command according to the reference table. The processor receives the electrical signal from the signal processing unit and calculates a first power value according to the electrical signal. The processor further multiplies the first power value by the weighting parameter to obtain a second power value and then adds the first power value and the second power value to get a total power value.

In addition, the another primary objective of the present disclosure is to provide a method of estimating total power including following steps: control the control unit by the user and output the weighting command with the control unit; receive the weighting command by the processor and store the weighting command into the memory unit; access the weighting parameter by the processor corresponding to the weighting command according to the reference table; correspondingly output the electrical signal by the signal processing unit according to the deformation of the sensing unit; receive the electrical signal outputted from the signal processing unit by the processor and calculate the first power value according to the electrical signal with the processor; obtain the second power value by multiplying the first power value by the weighting parameter by the processor according to the weighting command; obtain the total power value by adding the first power value and the second power value by the processor.

With the aforementioned design, the user could determine the weighting parameter according to experience or to the result measured by the measuring device. Base on the first power value obtained by actually measuring the force exerted by one of the two sides of the body of the user, the second power value exerted by the other one of the two sides of the body of the user could be estimated by multiplying the first power value by the weighting parameter, and then add the first power value and the second power value to get the total power value which is more accurate than the total power value measured by the conventional single-sided power meter.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
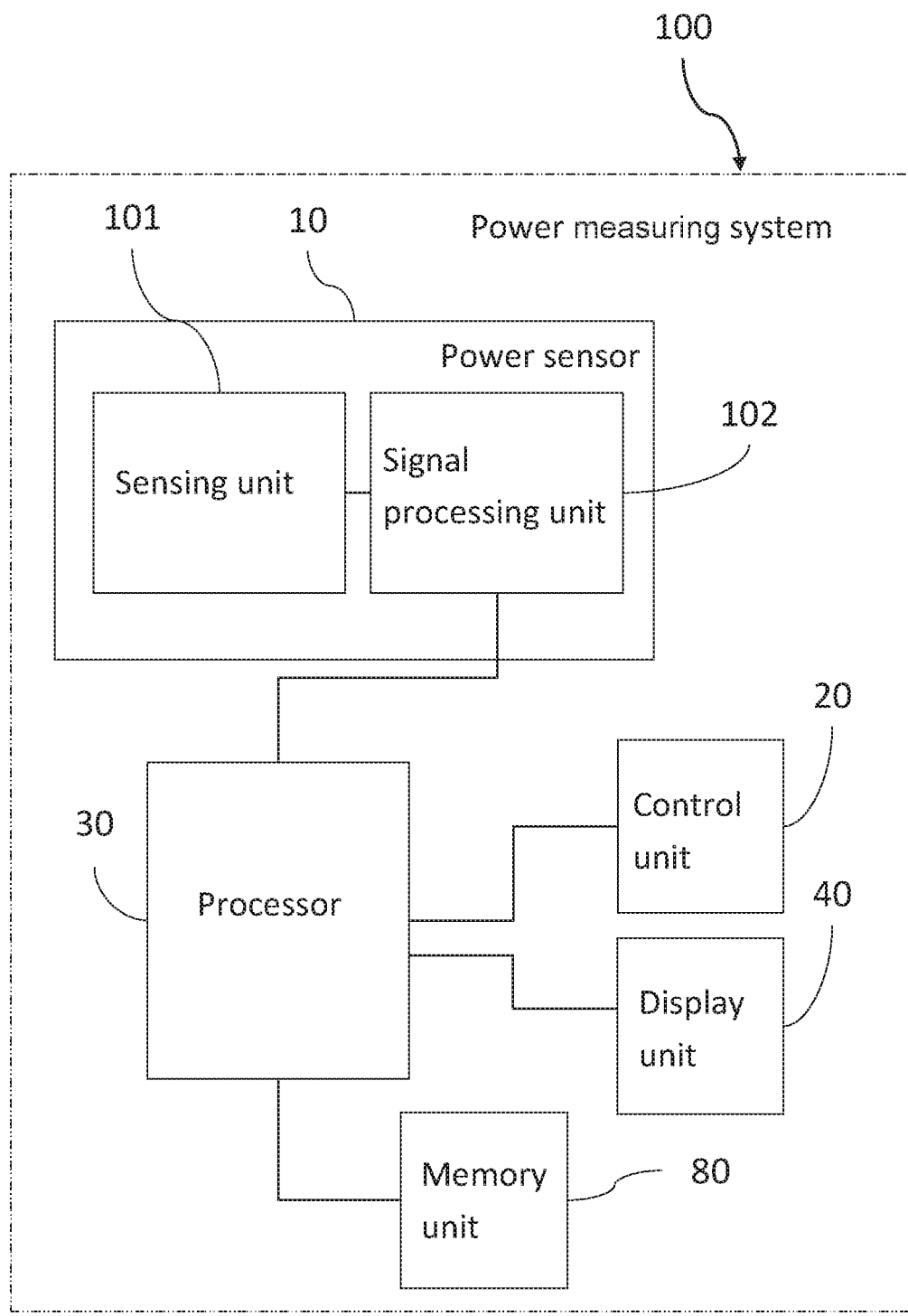
FIG. 1 is a schematic diagram of the power measuring system of an embodiment according to the present disclosure.

As illustrated in FIG. 1, a power measuring system 100 of an embodiment according to the present disclosure is adapted to a bicycle. The bicycle includes a right operational part and a left operational part, wherein the right operational part and the left operational part could be operated to drive the bicycle. The power measuring system 100 includes a power sensor 10, a control unit 20, a processor 30, a display unit 40, and a memory unit 80.

The power sensor 10 includes a sensing unit 101 and a signal processing unit 102. In the current embodiment, the sensing unit 101 is a strain gauge as an example, wherein the sensing unit 101 is disposed to either the right operational part or the left operational part. When a user exerts a force to either the right operational part or to the left operational part which is disposed with the sensing unit 101, the sensing unit 101 is deformed with the force exerted to the right operational part or to the left operational part.

The signal processing unit 102 includes a plurality of circuits, such as a bridge circuit, an amplifier circuit, an analog digital converter circuit, and so on. The signal processing unit 102 is connected to the sensing unit 101 by signal. As used in the description herein and throughout the claims that follow, the meaning of "connected by signal" may include connected in a wired or wireless manner. When the sensing unit 101 is deformed with a force that the user exerts on the right operational part or to the left operational part, the signal processing unit 102 correspondingly outputs an electrical signal according to the deformation of the sensing unit 101 that is caused by a force exerted on the bicycle by the user. The control unit 20 is adapted to be controlled by the user and to output a weighting command, wherein the control unit 20 is connected to the processor 30 by signal. The memory unit 80 is adapted to store a reference table and the weighting command inputted via the control unit 20. The processor 30 is respectively connected to the memory unit 80, the signal processing unit 102, and the display unit 40 by signal, wherein the processor 30 could be connected to the signal processing unit 102 in a wired or wireless manner. The processor 30, the control unit 20, and the display unit 40 could be integrated into a computer, a smartphone, or a bicycle cyclocomputer.

Figure 2:
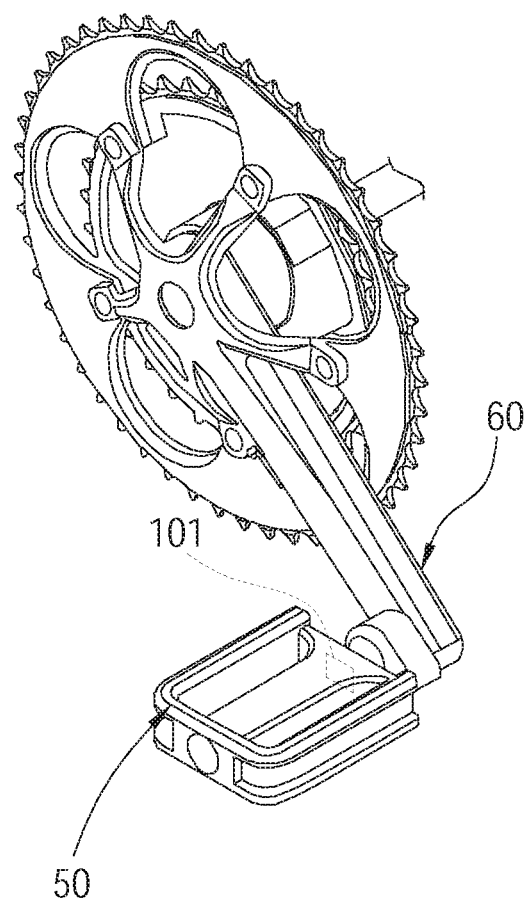
FIG. 2 is a schematic diagram showing the sensing unit is disposed on one side of the bicycle.
Figure 3:
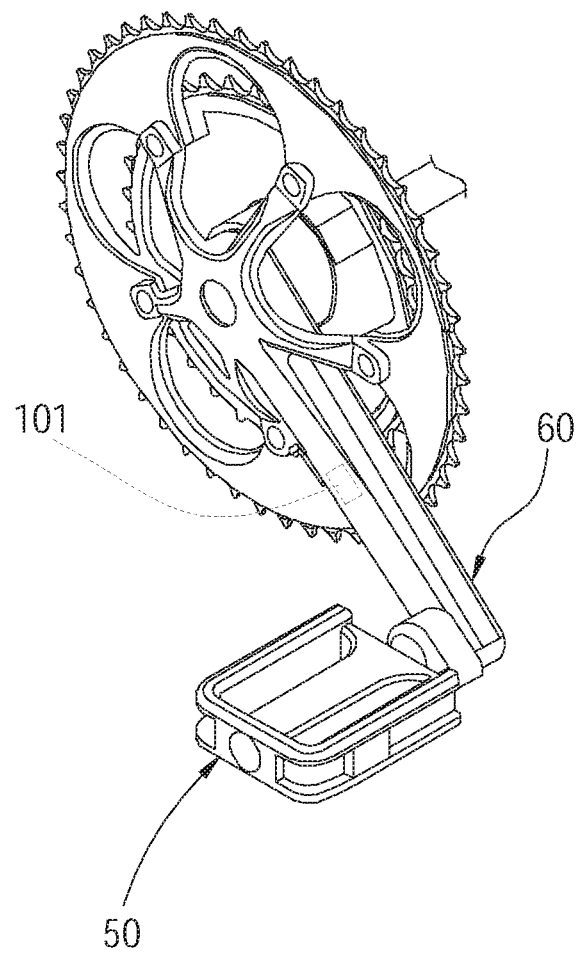
FIG. 3 is a schematic diagram showing the sensing unit is disposed on one side of the bicycle.

Referring to FIG. 2 and FIG. 3, the sensing unit 101 is disposed on a pedal 50 or a crank 60 of a side of the bicycle, so that when the user pedals the pedal 50, the sensing unit 101 disposed on the pedal 50 or the crank arm 60 is deformed with a force that the user exerts on the pedal 50 or the crank 60. In practice, the right operational part of the bicycle includes a right pedal, and the left operational part includes a left pedal, wherein the sensing unit 101 could be disposed on either the right pedal or the left pedal but not limited to a specific side of the bicycle. Similarly, in practice, the right operational part of the bicycle includes a right crank, and the left operational part includes a left crank, wherein the sensing unit 101 could be disposed on either the right crank or the left crank but not limited to a specific side of the bicycle.

Figure 4:
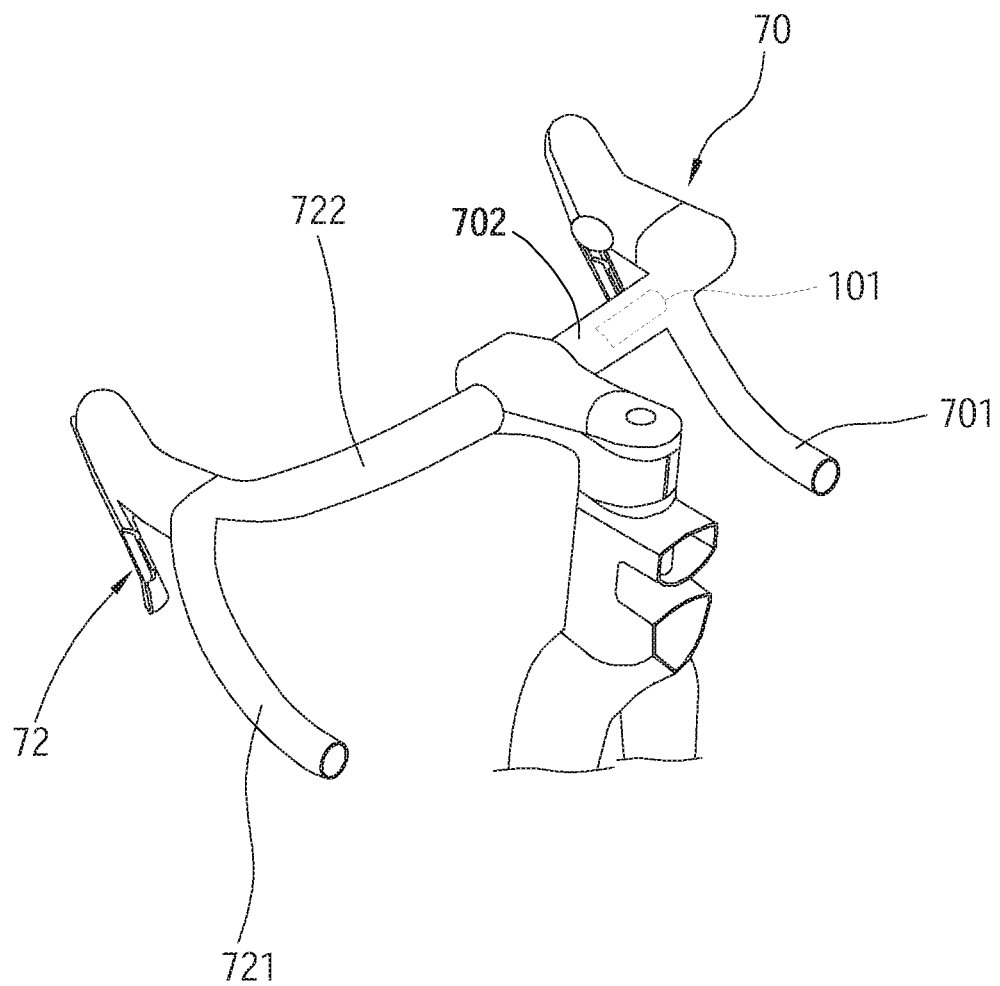
FIG. 4 is a schematic diagram showing the sensing unit is disposed on one side of the bicycle.

Additionally, the sensing unit 101 could also be disposed on a handle of the bicycle, as shown in FIG. 4. The right operational part of the bicycle includes a right handle 70, and the left operational part includes a left handle 72. The right handle 70 has a right holding section 701 and a right connecting section 702; the left handle 72 has a left holding section 721 and a left connecting section 722. The right holding section 701, the right connecting section 702, the left connecting section 722, and the left holding section 721 are sequentially connected, wherein the sensing unit 101 could be disposed to either the right connecting section 702 or the left connecting section 722 but not limited to a specific side of the bicycle. For example, when a bicyclist pedals out of the saddle, the bicyclist exerts a force to the right holding section 701 by a right hand of the bicyclist. At this time, the sensing unit 101 disposed on the right connecting section 702 is deformed with the force that the bicyclist exerts to the right holding section 701.

Figure 5:
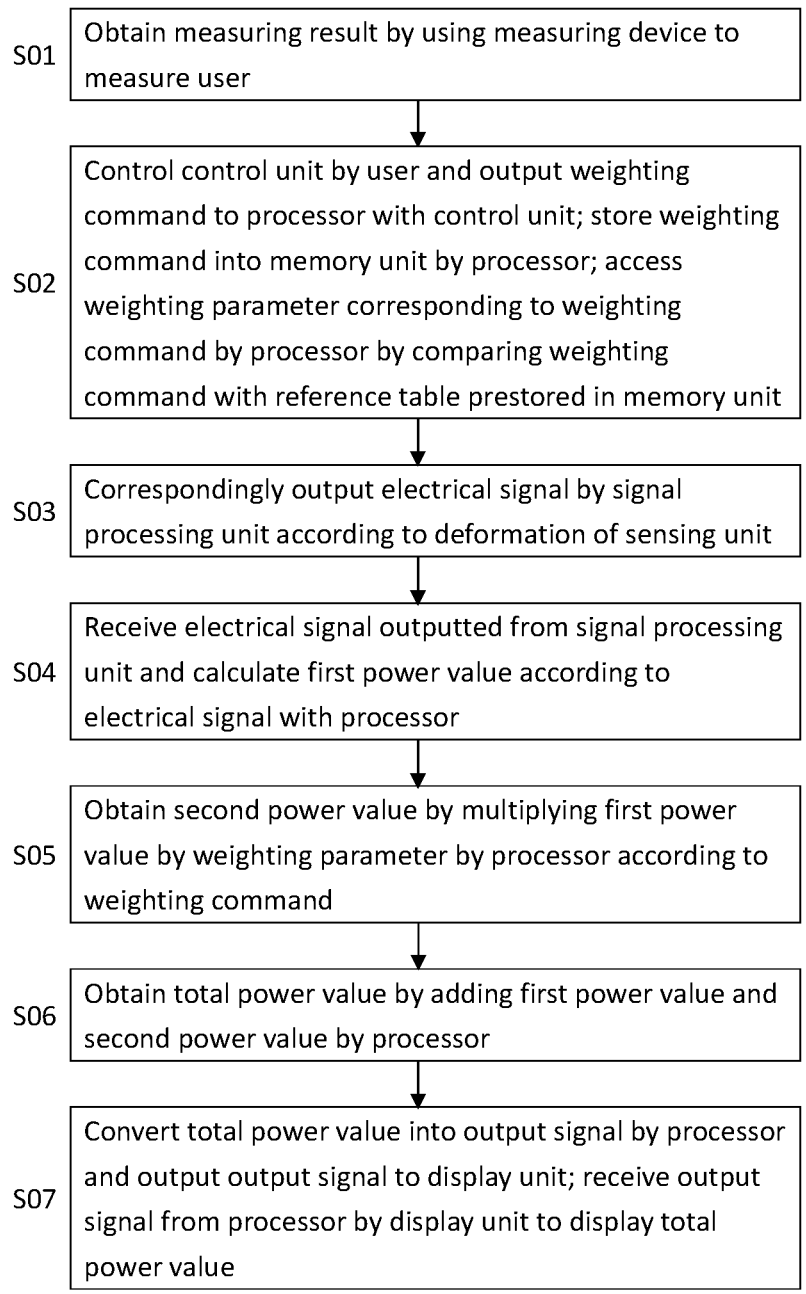
FIG. 5 is a flowchart showing the method of estimating total power which is applied to the power measuring system of the embodiment according to the present disclosure.

Referring to FIG. 5, a method of estimating total power which is applied to the power measuring system of the aforementioned embodiment is provided by the present disclosure and includes following steps:

Step S01: Use a measuring device to measure a user to obtain a measuring result. The measuring result includes a percentage of a force exerted by one of two sides of the user out of a total force exerted by the two sides of the user and a percentage of a force exerted by the other one of the two sides of the user out of the total force exerted by the two sides of the user. For example, the measuring device could be a bicycle disposed with a bilateral power meter, so that power respectively exerted by a left leg and a right leg of the user could be measured by the measuring device. In this way, the measuring result that the percentages of a force exerted by each of the legs out of the total force exerted by the two sides of the user could be obtained by further calculating.

Step 02: The control unit 20 is controlled by the user and outputs a weighting command to the processor 30. The processor 30 receives the weighting command and stores the weighting command into the memory unit 80 for comparing the weighting command with a reference table prestored in the memory unit 80, thereby to obtain a weighting parameter corresponding to the weighting command for being accessed by the processor 30. In this way, the user could set a value of the weighting parameter at will. In the current embodiment, the user sets the value of the weighting parameter according to the measuring result measured by the measuring device in Step S01. In other words, the value of the weighting parameter is a ratio of the percentage of a force exerted by one of two sides of a body of the user to the percentage of the force exerted by the other one of the two sides of the body of the user. In an embodiment, the user could set the weighting parameter according to self-experience or self-assessment.

Step S03: The signal processing unit 102 correspondingly outputs an electrical signal according to the deformation of the sensing unit 101 that is caused by a force exerted on the bicycle by the user. Step S04: The processor 30 receives the electrical signal outputted from the signal processing unit 102 and calculates a first power value according to the electrical signal. Step S05: The processor 30 multiplies the first power value by the weighting parameter to obtain a second power value. Step S06: The processor 30 adds the first power value and the second power value to get a total power value. Step S07: The processor 30 converts the total power value into an output signal and outputs the output signal to the display unit 40, wherein the display unit 40 receives the output signal sent by the processor 30 and displays the total power value for the user to view. By this way, the user could estimate the total power value exerted on the bicycle by the bicyclist more accurately.

For example, when the sensing unit 101 disposed to one side of the bicycle is deformed with a force that the bicyclist exerts to the bicycle, the signal processing unit 102 could correspondingly output the electrical signal according to the deformation of the sensing unit 101. The processor 30 receives the electrical signal outputted from the signal processing unit 102 and calculates the first power value according to the electrical signal. When the user sets the value of the weighting parameter as 0.8, the processor 30 multiplies the first power value by the weighting parameter (0.8) to get the second power value, and then the total power value could be obtained by adding the first power value and the second power value. After that, the total power value is converted and outputted to the display unit 40 for the user to look at. The total power value estimated by this way could be more accurate than that estimated by the conventional single-sided power meter.

It must be pointed out that the embodiment described above is only a preferred embodiment of the present disclosure. All equivalent structures and method which employ the concepts disclosed in this specification and the appended claims should fall within the scope of the present disclosure.

What is claimed is:

1. A power measuring system which is adapted to a bicycle, wherein the bicycle comprises a right operational part and a left operational part, and the right operational part and the left operational part are operable for a user to drive the bicycle; the power measuring system comprises:
    a power sensor comprising a sensing unit and a signal processing unit, wherein the sensing unit is disposed to either the right operational part or the left operational part; the signal processing unit is connected to the sensing unit by signal; the signal processing unit correspondingly outputs an electrical signal according to a deformation of the sensing unit;
    a control unit adapted to be controlled by the user and to output a weighting command;
    a memory unit adapted to store a reference table and the weighting command inputted via the control unit; and
    a processor connected to the signal processing unit, the memory unit, and the control unit by signal, wherein after the processor receives the weighting command, and stores the weighting command into the memory unit; the processor accesses a weighting parameter corresponding to the weighting command according to the reference table; the processor receives the electrical signal from the signal processing unit and calculates a first power value according to the electrical signal; the processor further multiplies the first power value by the weighting parameter to obtain a second power value and then adds the first power value and the second power value to get a total power value;
    wherein the weighting parameter is a ratio of a percentage of a force exerted by one of two sides of a body of the user out of a total force exerted by the two sides of the body of the user to a percentage of a force exerted by the other one of the two sides of the body of the user out of the total force exerted by the two sides of the body of the user.

2. The power measuring system of claim 1, wherein the right operational part comprises a right pedal, and the left operational part comprises a left pedal; the sensing unit is disposed to either the right pedal or the left pedal.

3. The power measuring system of claim 1, wherein the right operational part comprises a right crank, and the left operational part comprises a left crank; the sensing unit is disposed on either the right crank or the left crank.

4. The power measuring system of claim 1, wherein the right operational part comprises a right handle, and the left operational part comprises a left handle; the right handle has a right holding section and a right connecting section, and the left handle has a left holding section and a left connecting section; the right holding section, the right connecting section, the left connecting section, and the left holding section are sequentially connected; the sensing unit is disposed to either the right connecting section or the left connecting section.

5. The power measuring system of claim 1, further comprising a display unit connected to the processor by signal, wherein the processor converts the total power value into an output signal and outputs the output signal to the display unit, and the display unit receives the output signal from the processor to display the total power value.

6. A method of estimating total power which is applied to the power measuring system of claim 1, comprising following steps:
    controlling the control unit by the user and outputting the weighting command with the control unit;
    receiving the weighting command by the processor and storing the weighting command into the memory unit;
    accessing the weighting parameter by the processor corresponding to the weighting command according to the reference table;
    correspondingly outputting the electrical signal by the signal processing unit according to the deformation of the sensing unit;
    receiving the electrical signal outputted from the signal processing unit by the processor and calculating the first power value according to the electrical signal with the processor;
    obtaining the second power value by multiplying the first power value by the weighting parameter by the processor according to the weighting command;
    obtaining the total power value by adding the first power value and the second power value by the processor, wherein the weighting parameter is a ratio of a percentage of a force exerted by one of two sides of a body of the user out of a total force exerted by the two sides of the body of the user to a percentage of a force exerted by the other one of the two sides of the body of the user out of the total force exerted by the two sides of the body of the user.

7. The method of estimating total power of claim 6 further comprising using a measuring device to measure the user to obtain a measuring result, wherein the measuring result comprises the percentage of a force exerted by one of the two sides of the user out of the total force exerted by the two sides of the body of the user and the percentage of a force exerted by the other one of the two sides of the body of the user out of the total force exerted by the two sides of the body of the user.

8. The method of estimating total power of claim 6, wherein the power measuring system further comprises a display unit connected to the processor by signal, wherein the processor converts the total power value into an output signal and outputs the output signal to the display unit, and the display unit receives the output signal from the processor to display the total power value.

* * * * *